US008831619B2

(12) United States Patent
Wang et al.

(10) Patent No.: US 8,831,619 B2
(45) Date of Patent: Sep. 9, 2014

(54) METHOD OF SHARING INFORMATION BETWEEN BASE STATIONS ASSOCIATED WITH DIFFERENT NETWORK TECHNOLOGIES AND THE BASE STATIONS

(75) Inventors: Zhibi Wang, Woodridge, IL (US); Ruth Gayde, Naperville, IL (US); Mark Skeates, Bath (GB); John MacNamara, Orland Park, IL (US); Philip Sapiano, Corsham (GB)

(73) Assignee: Alcatel Lucent, Boulonge Billancourt (FR)

( * ) Notice: Subject to any disclaimer, the term of this patent is extended or adjusted under 35 U.S.C. 154(b) by 161 days.

(21) Appl. No.: 13/187,934

(22) Filed: Jul. 21, 2011

(65) Prior Publication Data

US 2013/0023301 A1 Jan. 24, 2013

(51) Int. Cl.
*H04W 36/00* (2009.01)

(52) U.S. Cl.
USPC ............................ 455/444; 455/443; 455/454

(58) Field of Classification Search
USPC ........... 455/424, 426.1, 435.2, 436–444, 449, 455/450; 370/328
See application file for complete search history.

(56) References Cited

U.S. PATENT DOCUMENTS

| 2005/0276273 | A1 | 12/2005 | Oprescu-Surcobe et al. |
| 2007/0165537 | A1 | 7/2007 | Magnusson et al. |
| 2009/0245200 | A1 | 10/2009 | Cakulev et al. |
| 2009/0275326 | A1* | 11/2009 | Lee et al. .................... 455/422.1 |
| 2009/0290502 | A1* | 11/2009 | Tinnakornsrisuphap et al. ............................ 370/252 |
| 2009/0296635 | A1* | 12/2009 | Hui et al. ....................... 370/328 |
| 2009/0316595 | A1* | 12/2009 | Kwon et al. ................... 370/252 |
| 2010/0008293 | A1 | 1/2010 | Gupta et al. |
| 2010/0041393 | A1* | 2/2010 | Kwon et al. ............... 455/426.1 |
| 2011/0009140 | A1* | 1/2011 | Hwang et al. ................. 455/509 |
| 2011/0019644 | A1* | 1/2011 | Cheon et al. ................... 370/331 |
| 2011/0165878 | A1* | 7/2011 | Nylander et al. ............ 455/436 |
| 2012/0122467 | A1* | 5/2012 | Auer et al. ................. 455/452.1 |
| 2012/0165012 | A1* | 6/2012 | Fischer et al. ............. 455/435.1 |

OTHER PUBLICATIONS

International Search Report for corresponding International Application No. PCT/US2012/045181.

\* cited by examiner

*Primary Examiner* — Dominic E Rego

(74) *Attorney, Agent, or Firm* — Harness, Dickey & Pierce

(57) ABSTRACT

In one embodiment, the method includes establishing, at a first base station, at least one interface with a second base station. The first and second base stations are associated with different network technologies, and at least one of the first and second base stations is a small cell base station. A small cell base station has a coverage area smaller than and at least partially overlapped by a coverage area of a macro base station. The method further includes one of (i) sending information from the first base station to the second base station over the interface, and (ii) receiving information at the first base station from the second base station over the interface.

21 Claims, 2 Drawing Sheets

METHOD OF SHARING INFORMATION BETWEEN BASE STATIONS ASSOCIATED WITH DIFFERENT NETWORK TECHNOLOGIES AND THE BASE STATIONS

BACKGROUND OF THE INVENTION

The wireless industry is experiencing ever increasing growth in data and service traffic. Smart phones and data devices are demanding more and more from wireless networks. To off-load the traffic in dense populated areas and increase indoor coverage, small cells have become a feasible solution. Namely, heterogeneous networks (HetNets) are now being developed wherein cells of smaller footprint size are embedded within the coverage area of larger macro cells or at least partially overlapped by the larger macro cells, primarily to provide increased capacity in targeted areas of data traffic concentration. Such heterogeneous networks try to exploit the spatial variations in user (and traffic) distribution to efficiently increase the overall capacity of the wireless network. Those smaller-sized cells are typically referred to as small cells in contrast to the larger and more conventional macro cells.

Also, wireless operators are using multiple technologies because of reasons such as merger, technology advancement, legacy customer retention, new spectrum availability, etc. The small cells used therefore will be a combination of small cells operating according to different technologies or standards, such as WCDMA, LTE, etc. Currently there is no standard way to share information between co-located small cells of different technologies, even if they are inside the same physical enclosure, or of sharing information between a co-located small cell and a macro cell of different technologies. Currently, information sharing with small cell elements (e.g., base stations) traverses through the core network of each technology. This causes several issues and problems, such as delay, increased network load, increased cost, and bad user experience.

SUMMARY OF THE INVENTION

At least one embodiment relates to method of sharing information between base stations associated with different network technologies.

In one embodiment, the method includes establishing, at a first base station, at least one interface with a second base station. The first and second base stations are associated with different network technologies, and at least one of the first and second base stations is a small cell base station. A small cell base station has a coverage area smaller than and at least partially overlapped by a coverage area of a macro base station. The method further includes one of (i) sending information from the first base station to the second base station over the interface, and (ii) receiving information at the first base station from the second base station over the interface.

For example, the first and second base stations may both be small cell base stations, the first base station may be a small cell base station and the second base station may be a macro base station, or the first base station may be a macro base station and the second base station may be a small cell base station.

The information may be neighbor information, session information, handoff information, data traffic, location information, routing information, tracking area information, and/or pertain to a transmit footprint of one of the first and second base stations.

In one embodiment, the method further includes determining, at the first base station, co-located base stations associated with technologies different from the first base station. In this embodiment, the second base station is one of the determined co-located base stations.

For example, the determining may be based on operator input indicating the co-located base stations associated with technologies different from the first base station.

Alternatively, the determining may be performed according to automatic discovery process.

In one embodiment, at least one co-located base station has an antenna on a same support structure as the first base station.

In another embodiment, at least one co-located base station has electronics housed in a same enclosure as the first base station.

In a further embodiment, at least one co-located base station shares a backhaul connection with the first base station.

In a still further embodiment, at least one co-located base station is separated by a distance less than a threshold distance.

Another embodiment of the method includes establishing, at a first base station, at least one communication path to a second base station that by-passes a wireless core network. Namely, the communication path does not include a core network. The first and second base stations are associated with different network technologies, and at least one of the first and second base stations being a small cell base station. The small cell base station has a coverage area smaller than and at least partially overlapped by a coverage area of a macro base station. The method further includes one of (i) sending information from the first base station to the second base station over the interface, and (ii) receiving information at the first base station from the second base station over the interface.

At least one embodiment also relates to a base station.

In one embodiment, a small cell base station is configured to establish at least one interface with an other base station. The small cell base station and the other base station are associated with different network technologies, and the small cell base station has a coverage area smaller than and at least partially overlapped by a coverage area of a macro base station. The small cell base station is configured to one of (i) send information to the other base station over the interface, and (ii) receive information from the other base station over the interface.

In another embodiment, a macro base station is configured to establish at least one interface with a small cell base station. The small cell base station and the macro base station are associated with different network technologies, and the small cell base station has a coverage area smaller than and at least partially overlapped by a coverage area of the macro base station. The macro cell base station is configured to one of (i) send information to the small cell base station over the interface, and (ii) receive information from the small cell base station over the interface.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
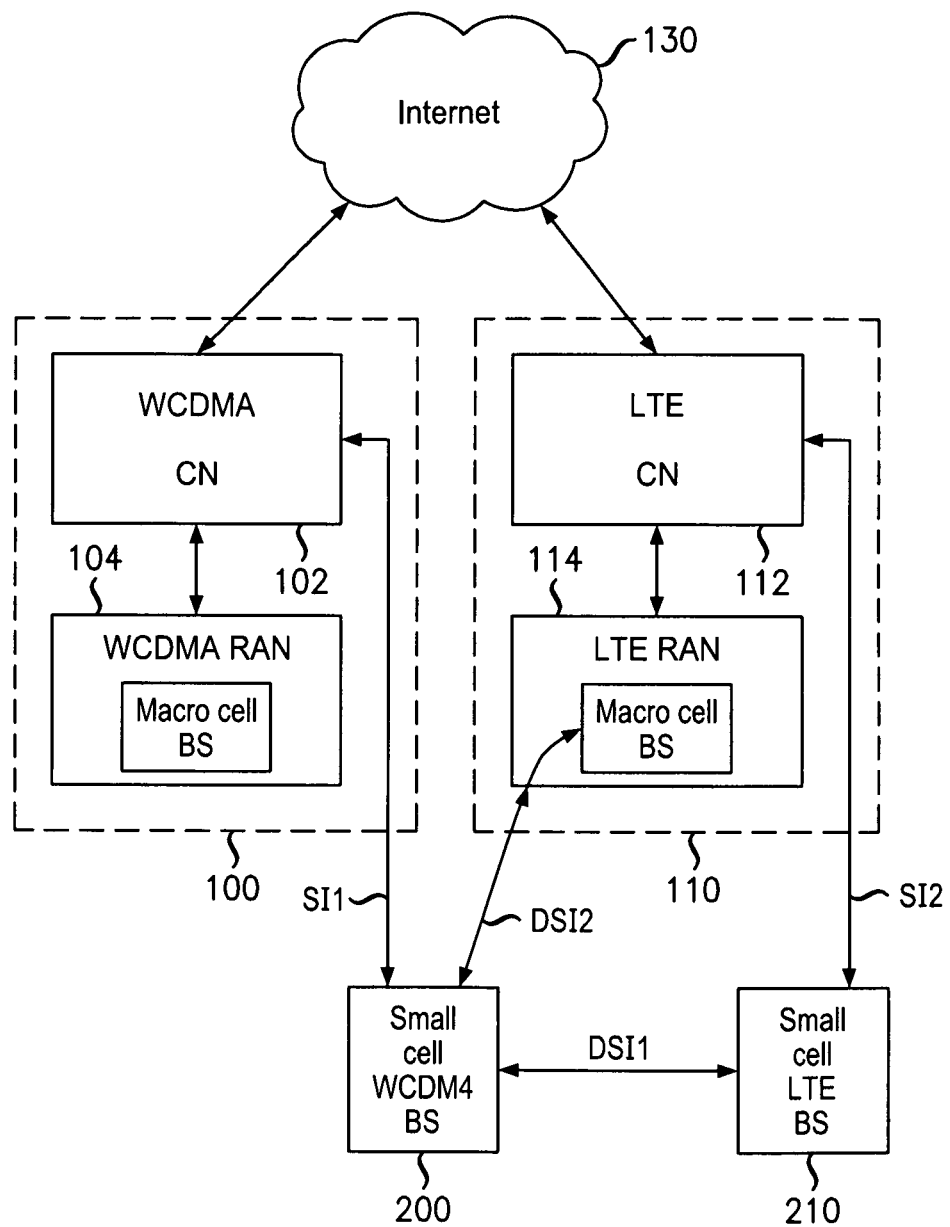
FIG. 1 illustrates a portion of a multiple technology wireless architecture.

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In the following description, for purposes of explanation and not limitation, specific details are set forth such as particular architectures, interfaces, techniques, etc., in order to provide a thorough understanding of the embodiments. However, it will be apparent to those skilled in the art that the embodiments may be practiced in ways that depart from these specific details. In some instances, detailed descriptions of well-known devices, circuits, and methods are omitted so as not to obscure the description of the embodiments with unnecessary detail. All principles, aspects, etc. of the embodiments, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

Portions of the embodiments and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be solid state (e.g., flash memory), magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, over-the-air or some other suitable transmission medium known to the art. The embodiments are not limited by these aspects of any given implementation.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The embodiments will now be described with reference to the attached figures. Various structures, systems and devices are schematically depicted in the drawings for purposes of explanation only and so as to not obscure the embodiments with details that are well known to those skilled in the art. Nevertheless, the attached drawings are included to describe and explain illustrative examples. Where applicable, the words and phrases used herein should be understood and interpreted to have a meaning consistent with the understanding of those words and phrases by those skilled in the relevant art.

As used herein, the term "access terminal" may be considered synonymous to, and may hereafter be occasionally referred to, as a client, mobile station, mobile, mobile unit, mobile station, mobile user, user equipment (UE), subscriber, user, remote station, receiver, etc., and may describe a remote user of wireless resources in a wireless communication network. The wireless resource may be a mobile phone, wireless equipped personal computer, etc. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users.

As is well-known in the art, each of a access terminal and a base station may have transmission and reception capabilities. Transmission from the base station to the access terminal is referred to as downlink or forward link communication. Transmission from the access terminal to the base station is referred to as uplink or reverse link communication.

FIG. 1 illustrates a portion of a multiple technology wireless architecture including macro cells and small cells according to an example embodiment. In particular, FIG. 1 illustrates two different wireless technologies having associated macro and small cells. The wireless technologies represented are WCDMA and LTE. It should be understood that the embodiments are not limited to two different wireless technologies. Instead, the embodiments are applicable to any combination of two or more different wireless technologies. Also, the embodiments are not limited to the wireless technologies of WCDMA and LTE.

As shown in FIG. 1, a small cell base station 200 operating according WCDMA communicates over a first standard interface SI1 with a core network 102 of WCDMA wireless network 100. Besides the core network 102, the WCDMA wireless network 100 also includes a radio access network 104 that includes one or more macro cells. As used herein, the terminology "cell" refers to the coverage area as well as the base station serving the coverage area. Furthermore, it will be understood that each cell has an associated base station. While not shown, the radio access network 104 may also include radio network controllers managing one or more base stations. The core network 102 provides system level control over one or more radio access networks 104, and provides communication gateways to other networks such as the internet 130.

FIG. 1 further shows that a LTE small cell base station 210 operating according LTE, communicates over a second standard interface SI2 with a core network 112 of a LTE, wireless network 110. Besides the core network 112, the LTE wireless network 110 also includes a radio access network 114 that includes one or more macro cells. While not shown, the radio access network 114 may also include radio network controllers managing one or more base stations. The core network 112 provides system level control over one or more radio access networks 114, and provides communication gateways to other networks such as the internet 130.

For the purposes of discussion, it will be assumed that at least one macro cell base station in each of the WCMDA radio access network 104 and the LTE radio access network 114 have substantially overlapping coverage areas. For the purposes of discussion, it will further be assumed that each of the small cell WCDMA base station 200 and the small cell LIE base station 210 have substantially overlapping coverage areas that fall within or significantly overlap with the coverage areas of the macro cell base stations. Namely, the small cells at least partially overlap with a corresponding macro cell. Additionally, being small cells, the transmit power output and resultant coverage areas of these base stations are smaller than that of the macro cells.

Conventionally, communication between small cells of the different wireless technologies traverses the core networks of both technologies. Similarly, communication between a small cell of one technology and the macro cell of a different technology also traverses the core networks of both technologies.

In one embodiment, a direct sharing interface may be established between small cells of different wireless technologies. Additionally, or alternatively, a direct sharing interface may be established between a small cell and a macro cell of different wireless technologies. For example, FIG. 1 shows a first direct sharing interface DSI1 between the small cell base station 200 operating according to WCDMA and the small cell base station 210 operating according to LTE. As another example, FIG. 1 shows a second direct sharing interface DSI1 between the small cell base station 200 operating according to WCDMA and a macro cell base station in the LTE radio network 114.

Figure 2:
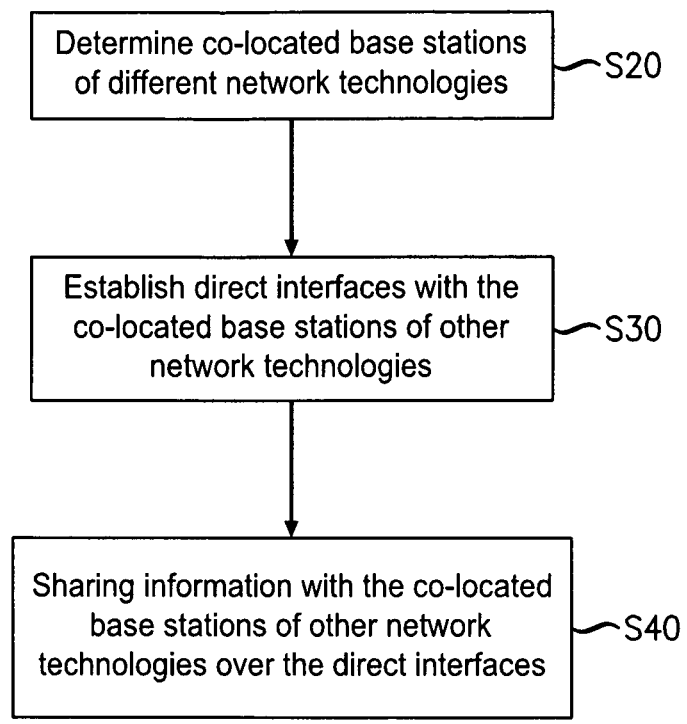
FIG. 2 illustrates a flow chart of a method for sharing information according to an example embodiment.

Next, establishing the direct sharing interface and sharing of information over the established direct sharing interface will be described in detail. FIG. 2 illustrates a flow chart of a method for establishing the direct sharing interface and sharing of information over the established direct sharing interface. For the purposes of example only, the method will be described as being performed at a small cell base station of a first network technology. As shown, in step S20, a small cell base station determines co-located small cell and/or macro cell base stations operating according to network technologies different from the first network technology.

A co-located base station may be a base station having an antenna on a same support structure (e.g., building, light post, tower, etc.) as the small cell base station. Alternatively, or additionally, a co-located base station may be a base station having electronics housed in a same enclosure as the small cell base station. Alternatively, or additionally, a co-located base station may be within a threshold distance of the small cell base station. The threshold distance may be a design parameter determined through empirical study. Alternatively, or additionally, co-located base stations may share a physical backhaul connection such as to an operator's core network.

In one embodiment, the small cell base station receives operator input indicating the co-located base station(s).

In another embodiment, the small cell base station may pedal an auto discovery operation to determine the co-located base stations. For example, each small cell and macro cell base station may be equipped with a global position sensor (GPS), and may report its location to a network server. The network server may be a server in one or more of the core networks of the different technologies, and these servers may communicate with one another. Alternatively, a single server may serve multiple core networks of different technologies, and be communicatively connected to those core networks. The server determines co-located base stations, and sends each base station a report indicating the co-located base stations. The server may determine base stations as being co-located if a distance between the base stations is less than a threshold distance. As will be appreciated, the threshold distance may be a design parameter determined through empirical study. Accordingly, each small cell and macro cell base station may receive the report automatically, and/or, may request the report from the network server.

In a further embodiment, if housed in the same enclosure, the electronics of the base stations associated with different technologies may share one or more communication buses, and may poll for the presence of the other base stations.

As will be appreciated these above described embodiments for determining co-located base stations is not exhaustive, and one or more of these embodiments may be employed together/concurrently.

Returning to FIG. 2, after determining the co-located base stations of different technologies, the small cell base station establishes direct sharing interfaces with one or more of the co-located base stations of other network technologies in step S30. The interface may be a physical, wireline interface or a wireless interface. For example, when the small cell base station and the co-located base station are disposed within the same enclosure and share a communication bus, the interface may be a physical interface over the bus. Alternatively, another type of physical connection (e.g., Ethernet, etc.) may be exist and be employed for the interface. With respect to the wireless interface, the base stations may be configured to communicate on overhead channels (or portions thereof) used in the various different wireless technologies.

Establishing the direct sharing interface may performed through a request-acknowledgement scheme where the small cell base station sends a request message that requests the co-located base station of the different technology become interfaced therewith. In response, the co-located base station sends an acknowledgement message, and the interface is established. As will be appreciated, the request-acknowledgement scheme may be modified to include any well-known authentication procedure. Still further, the request-acknowledgement scheme may be modified to include establishing the interface as an encrypted link according to any well-known procedure.

Once the direct sharing interfaces are established, the interfacing base stations may share information in step S40. Namely, the small cell base station may receive information from the co-located base station of the different technology, and/or the small cell base station may send information to the co-located base station of the different technology.

Various types of information may be shared. For example, the base stations may share neighbor information. The neighbor information may include a list of known neighboring base stations, to facilitate self organizing networks (SONs) and/or Automatic Neighbor Relation (ANR). ANR allows the eNodeBs to populate their neighbor lists, by utilizing information reported by a UE on detected LTE, WCDMA and GSM neighbors. In LTE, this functionality is supported by all releases of UE, but in WCDMA it is not available until much later in the standards. Because the neighbors detected by the eNodeB are equally applicable to the WCDMA portion of the small cell as the two units are co-located, the information shared can be used for the WCDMA neighbor generation.

ANR can also be realized by the small cell moving into a "Sniffing Mode," which is where the small cell receiver tunes into the downlink frequency and decodes the neighbor cells. As this may involve hardware impact on the RF chain, and service interruption, it is advantageous to have only one of the small cells portions (e.g. WCDMA) perform this function and share the result with the other small cells (e.g. LTE).

Additionally, or alternatively, the shared information may include session information. Session information can include the charging information, call state, security keys and parameters, QoS information, policy information, and etc.

Additionally, or alternatively, the shared information may include handoff or handover information. The handoff information can be user traffic queued at small cells, IDs such as IP address, radio measurements, radio channel information, cell IDs, circuit IDs, UE location, and etc.

Additionally, or alternatively, the shared information may include data traffic (e.g., forwarded after handoff or during a handoff).

Additionally, or alternatively, the shared information may include location information.

Additionally, or alternatively, the shared information may include cell load information such as uplink (UL)/downlink (DL) RF and baseband load, number of users served etc, where the mutual load information allows a decision upon whether to redirect UEs from one layer to another or to the Macro layer.

Additionally, or alternatively, the shared information may include information on the transmit footprint (e.g., pathloss at cell edge measured by UEs) of the small cell in order to determine whether one cell portion has a larger footprint than the other. This information can then be used to determine whether mobility between layers can be reliably performed through blind handover/redirection or whether mobile assisted measurements are required.

Additionally, or alternatively, the shared information may include information on the location (WCDMA)/routing (WCDMA)/tracking area (LTE) so that the two areas may be coordinated in order to benefit from Idle Mode Signaling Reduction (ISR) feature in LTE (TS 23.401)

By sharing info illation directly between small cells of different technologies or between a small cell of one technology and a macro cell of another technology, load on the core networks may be greatly reduced. Namely, by establishing a communication path that by-passes the core networks of the macro cells (i.e., excludes the core networks of the macro cells), load on the core networks may be greatly reduced. Additionally, various processes, such as handover, multicasting, etc. may be performed more efficiently and with significantly less delay.

The invention being thus described, it will be obvious that the same may be varied in many ways. Such variations are not to be regarded as a departure from the invention, and all such modifications are intended to be included within the scope of the invention.

We claim:

1. A method of sharing information between base stations associated with different network technologies, comprising:

establishing, at a first base station, at least one interface with a second base station, the first and second base stations being associated with different network technologies, at least one of the first and second base stations being a small cell base station, the small cell base station having a coverage area smaller than and at least partially overlapped by a coverage area of a macro base station; and one of (i) sending information from the first base station to the second base station over the interface without the information traversing a core network of each of the first and second base stations, and (ii) receiving information at the first base station from the second base station over the interface without the information traversing a core network of each of the first and second base stations, the information including at least session information.

2. The method of claim 1, wherein the first and second base stations are both small cell base stations.

3. The method of claim 1, wherein the first base station is a small cell base station and the second base station is a macro base station.

4. The method of claim 1, wherein the first base station is a macro base station and the second base station is a small cell base station.

5. The method of claim 1, wherein the information further includes neighbor information.

6. The method of claim 1, wherein the information further includes session information.

7. The method of claim 1, wherein the information further includes handoff information.

8. The method of claim 1, wherein the information further includes data traffic.

9. The method of claim 1, wherein the information further includes at least one of location information, routing information, and tracking area information.

10. The method of claim 1, wherein the information pertains to a transmit footprint of one of the first and second base stations.

11. The method of claim 1, further comprising:
determining, at the first base station, co-located base stations associated with technologies different from the first base station; and wherein
the second base station is one of the determined co-located base stations.

12. The method of claim 11, wherein the determining includes receiving operator input indicating the co-located base stations associated with technologies different from the first base station.

13. The method of claim 11, wherein the determining is performed according to automatic discovery process.

14. The method of claim 13, wherein the automatic discovery process comprises:
sending, from the first base station, a location of the first base station to a server; and
receiving, at the first base station, a report of the co-located base stations associated with technologies different from the first base station.

15. The method of claim 11, wherein at least one co-located base station has an antenna on a same support structure as the first base station.

16. The method of claim 11, wherein at least one co-located base station has electronics housed in a same enclosure as the first base station.

17. The method of claim 11, wherein at least one co-located base station shares a backhaul connection with the first base station.

18. The method of claim 11, wherein at least one co-located base station is separated by a distance less than a threshold distance.

19. A method of sharing information between base stations associated with different network technologies, comprising:
establishing, at a first base station, at least one communication path to a second base station that by-passes a wireless core network, the first and second base stations being associated with different network technologies, at least one of the first and second base stations being a small cell base station, the small cell base station having a coverage area smaller than and at least partially overlapped by a coverage area of a macro base station; and
one of (i) sending information from the first base station to the second base station over the inteface without the information traversing a core network of each of the first and second base stations, and (ii) receiving information at the first base station from the second base station over the interface without the information traversing a core network of each of the first and second base stations, the information including at least session information.

20. A small cell base station configured to establish at least one interface with an other base station, the small cell base station and the other base station being associated with different network technologies, the small cell base station having a coverage area smaller than and at least partially overlapped by a coverage area of a macro base station; and
the small cell base station configured to one of (i) send information to the other base station over the inteface without the information traversing a core network of each of the first and second base stations, and (ii) receive information from the other base station over the interface without the information traversing a core network of each of the first and second base stations, the information including at least session information.

21. A macro base station configured to establish at least one interface with a small cell base station, the small cell base station and the macro base station being associated with different network technologies, the small cell base station having a coverage area smaller than and at least partially overlapped by a coverage area of the macro base station; and
the macro cell base station configured to one of (i) send information to the small cell base station over the inteface without the information traversing a core network of each of the first and second base stations, and (ii) receive information from the other base station over the interface without the information traversing a core network of each of the first and second base stations, the information including at least session information.

* * * * *